No. 621,923. Patented Mar. 28, 1899.
H. KERRINNES.
METHOD OF PRODUCING PRESS PEAT.
(Application filed Dec. 24, 1897.)

(No Model.)

WITNESSES: Fred White, Thomas F. Wallace

INVENTOR: Heinrich Kerrinnes, By his Attorneys

UNITED STATES PATENT OFFICE.

HEINRICH KERRINNES, OF YORKSDORF, GERMANY.

METHOD OF PRODUCING PRESS-PEAT.

SPECIFICATION forming part of Letters Patent No. 621,923, dated March 28, 1899.

Application filed December 24, 1897. Serial No. 663,294. (No specimens.)

*To all whom it may concern:*

Be it known that I, HEINRICH KERRINNES, a subject of the German Emperor, and a resident of Yorksdorf, near Gr. Baum, East Prussia, Germany, have invented a Method of Producing Press-Peat, (for which Letters Patent have been obtained in Germany, No. 89,591, dated January 29, 1896;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention is designed to produce pressed peat in a compact state which is economical in use and which has the advantage of occupying a comparatively small space, so important for storage and transport.

According to my invention the peat coming from the pit is torn or broken up and mixed, preferably by means of cutters arranged in a spiral line around a rotating shaft, so that the mass is formed into a thin paste and all fibers are destroyed. After this the material is partly deprived of its water either by pressing by means of rollers or the like or by drying artificially or by the aid of air-currents. In order to give the material made thus compact an equal consistency throughout, the same is once more thoroughly mixed, whereupon it is formed into pieces of the desired shape in a press, compressing the same more or less, according to the season and to the temperature.

In the accompanying drawings I have shown an apparatus which is well adapted to carry my process into effect.

Figure 1:
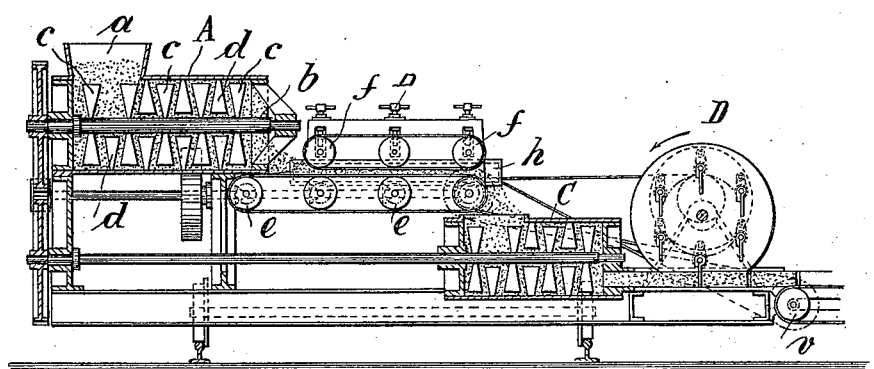
Figure 2:
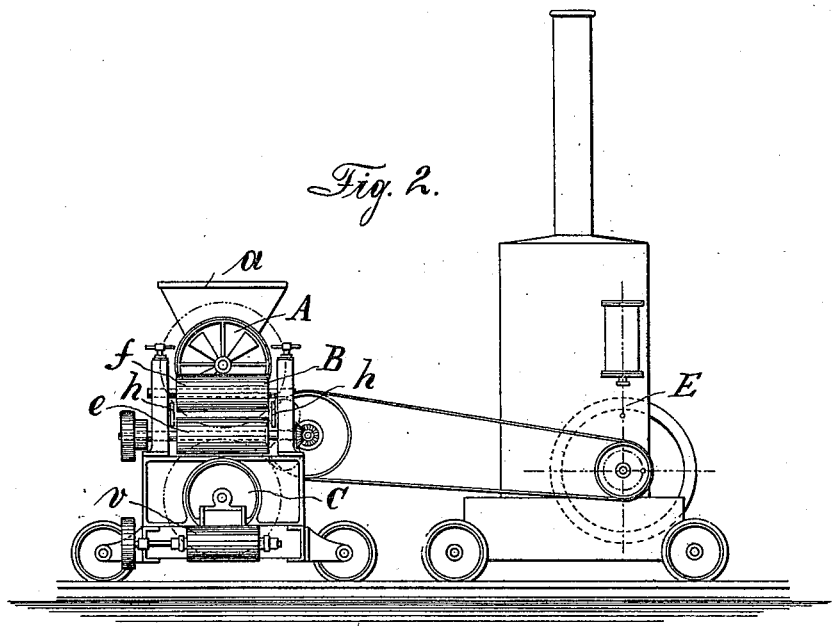

Figure 1 is a vertical longitudinal section of this apparatus; and Fig. 2 is an end view of the same, showing also a portable engine for operating the apparatus.

This apparatus consists of the mixing or cutting drum A, the device B for depriving the mass of its water or partly depriving it of its water, a second mixing-drum C, the dividing device D, and the motor E.

The raw peat is fed into the drum A through the hopper $a$ and is here well broken up and mixed by means of the cutters $c$, mounted on the shaft $b$, and of the cutters $d$, mounted on the inside of the drum-wall, so that the mass leaves the drum in a homogeneous state. The cutters are placed at an angle on a spiral line, in consequence of which the peat is slowly moved to the other end of the drum by the rotation of the shaft $b$, falling out on the endless belt running over the rollers $e$, forming part of the device B for draining the peat. Above the rollers $e$ there are other rollers $f$, over which also an endless belt is stretched and which are made adjustable toward and from the first-named rollers $e$ by means of adjusting-screws, according to the condition of the material to be acted upon. For draining off the water on both ends of the rollers there are frames $h$, as shown clearly in Figs. 1 and 2, which may be covered with filtering material. When the peat passes these rolls, it loses only so much of its water that it is still damp enough to be again operated upon in the mixing-drum C and has also sufficient consistency that it can be handled when leaving the machine. The mass passing through the chest of the press $i$ is here cut into pieces of any desired length by means of a dividing device. These pieces are led away into a drying-shed on endless belts stretched over rollers, of which one, $v$, is shown in the drawings.

While I prefer to use the apparatus just described in carrying out my improved method, it will be understood that any suitable means may be employed, as such means form no part of my present invention.

Having now particularly described my invention, what I claim, and desire to secure by Letters Patent, is—

The described method for producing pressed peat in which the peat coming from the pit and while in a wet state is broken up, well mixed, partly deprived of its water, mixed a second time and finally pressed into shape.

In testimony that I claim the foregoing as my invention I have signed my name in presence of two subscribing witnesses.

HEINRICH KERRINNES.

Witnesses:
 CHARLES H. DAY,
 MAX. C. STAEHLER.